US008277666B2

(12) United States Patent
Sturgess

(10) Patent No.: US 8,277,666 B2
(45) Date of Patent: Oct. 2, 2012

(54) DRINKING CONTAINER WITH FILTER FILLING RESERVOIR

(76) Inventor: Patricia Kim Sturgess, Calgary (CA)

( * ) Notice: Subject to any disclaimer, the term of this patent is extended or adjusted under 35 U.S.C. 154(b) by 210 days.

(21) Appl. No.: 12/621,833

(22) Filed: Nov. 19, 2009

(65) Prior Publication Data
US 2011/0117257 A1   May 19, 2011

(51) Int. Cl.
*C02F 1/00* (2006.01)
*B01D 35/26* (2006.01)

(52) U.S. Cl. ............ 210/808; 210/245; 210/416.3; 210/464; 210/482; 210/502.1

(58) Field of Classification Search ............ 210/244, 210/416.3, 245, 464, 482, 502.1, 808
See application file for complete search history.

(56) References Cited

U.S. PATENT DOCUMENTS

| 4,054,526 A | 10/1977 | Muller |
| 4,151,092 A | 4/1979 | Grimm et al. |
| 4,477,347 A | 10/1984 | Sylva |
| 4,529,511 A | 7/1985 | Breeden et al. |
| 5,268,093 A | 12/1993 | Hembree et al. |
| 5,534,145 A | 7/1996 | Platter et al. |
| 5,733,448 A | 3/1998 | Kaura |
| 6,344,146 B1 | 2/2002 | Moorehead et al. |

FOREIGN PATENT DOCUMENTS

CN    201353444 Y    12/2009

OTHER PUBLICATIONS

International Search Report mailed Feb. 15, 2011, in relation to PCT Application No. PCT/CA2010/001741 filed Nov. 4, 2010.
Written Opinion mailed Feb. 15, 2011, in relation to PCT Application No. PCT/CA2010/001741 filed Nov. 4, 2010.

*Primary Examiner* — Matthew Savage

(57) ABSTRACT

A drinking container includes a main reservoir; a filling reservoir; a filter connecting the filling reservoir to the main reservoir; a plunger assembly having a plunger head in the filling reservoir and a shaft extending therefrom. The shaft defines a passageway from to an opening in the plunger head, to allow addition of liquid through the passageway into the filling reservoir. A valve allows closing of the opening to allow the plunger head to be urged into the filing reservoir, thereby urging liquid in the filling reservoir through the filter into the drinking reservoir.

15 Claims, 12 Drawing Sheets

DRINKING CONTAINER WITH FILTER FILLING RESERVOIR

FIELD OF THE INVENTION

The present invention relates generally to drinking containers, and more particularly to a drinking container suitable for filtering a drinking fluid, and in particular water.

BACKGROUND OF THE INVENTION

In recent years, the consumption of still water in place of carbonated water, soft drinks and fruit juices, has become popular with consumers. Although clean tap water is available in most parts of the industrialized world, consumers prefer water that is perceived to be more pure. As a consequence, bottled water from natural springs and other sources has become popular and profitable.

Home filtration of water using reverse osmosis, or charcoal filtering has also become common place.

At present, however, filtration of water by consumers away from the home remains difficult if not impractical. Although portable filtration devices are known, and available from manufacturers like Katadyn, Aquasafe, and MSR, these are typically designed for camping or similar use, and are typically bulky and impractical to transport.

Accordingly, there remains a need for portable device allowing the filtration and transport of filtered water.

SUMMARY OF THE INVENTION

In accordance with an aspect of the present invention, there is provided a drinking container comprising: a main reservoir; a filling reservoir; a filter connecting the filling reservoir to the main reservoir; a plunger assembly having a plunger head in the filling reservoir and a shaft extending therefrom. The shaft defines a passageway from to an opening in the plunger head, to allow addition of liquid through the passageway into the filling reservoir. A valve allows closing of the opening to allow the plunger head to be urged into the filing reservoir, thereby urging liquid in the filling reservoir through the filter into the drinking reservoir.

In accordance with another aspect of the present invention, there is provided a method of filtering a liquid for consumption. The method comprises: providing a drinking container comprising a main reservoir and a filling reservoir, a porous filter extending between the main reservoir and the filling reservoir, and a plunger assembly extending from the filling reservoir; adding a desired amount of liquid to the filling reservoir through a passageway in the plunger assembly; sealing the passageway to prevent back flow from the filling reservoir into the passageway; urging the plunger assembly through the filling reservoir to urge the desired amount of liquid from the filling reservoir, through the porous filter and into the main reservoir.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1A:
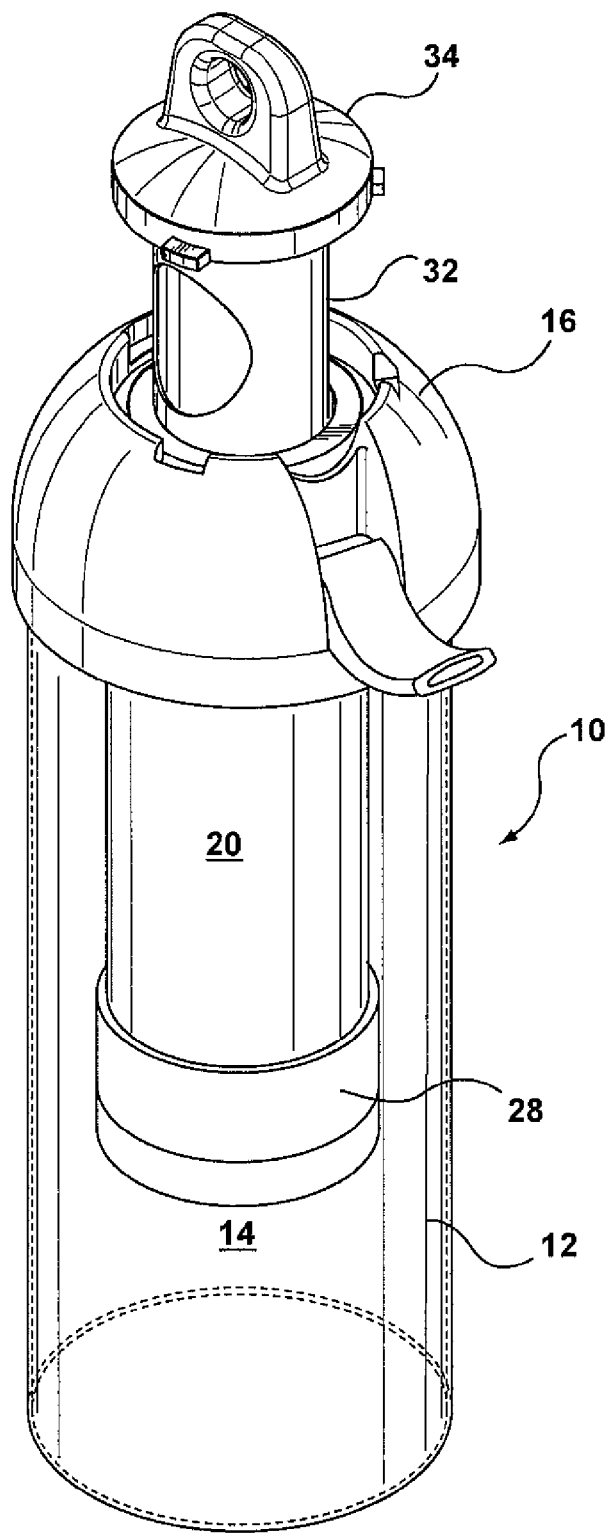
FIG. 1A is a perspective view of a drinking container, exemplary of an embodiment of the present invention.
Figure 1B:
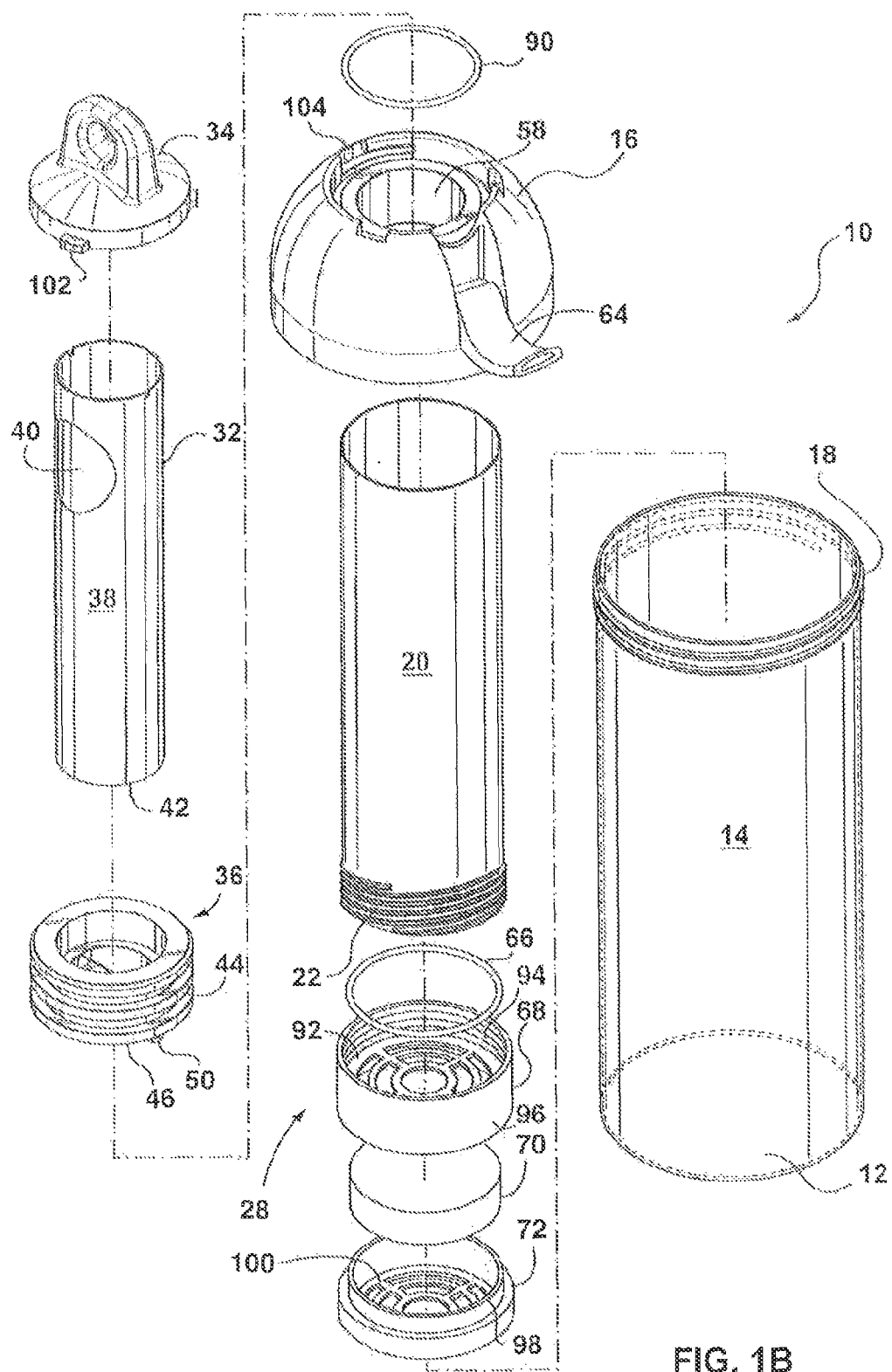
FIG. 1B is an exploded perspective view of the container of FIG. 1A.

FIG. 1A depicts a drinking container 10 exemplary of an embodiment of the present invention. An exploded view of drinking container 10 is depicted in FIG. 1B. As illustrated, drinking container 10 is formed of a main container 12 defining a main fluid reservoir 14. Main container 12 is capped by a lid 16.

Drinking container 10 is intended to be portable. As such typical embodiments of drinking container 10 have a main fluid reservoir 14 with a volume less than 4 liters, and typically less than 1 liter. Exemplary dimensions are for a 250 mL to 750 mL bottle. Of course, the drinking container may be formed in any suitable size.

Main container 12 may be formed as a cylindrical container having a top thread 18 for engaging a complementary thread of lid 16 (as depicted in FIG. 1B). Main container 12 can be formed of plastic, aluminium, tin, steel or any other material suitable for containing liquid to be transported and drunk. The interior of container 12, and thus the walls of main fluid reservoir 14 may be coated with a material complementary to liquid to be contained within main reservoir 14. For example, the interior of container 12 may be coated with copper, brass, nickel, a rubber lining, a plastic or other synthetic lining, or the like. In the depicted embodiment, drinking container 10 is particularly suitable for drinking water. Of course, other suitable shapes, lid connections, and materials will be apparent to those of ordinary skill.

Mounted within main fluid reservoir 14 is a filling/filtration reservoir 20. Filling/filtration reservoir 20 allows the addition of water or another liquid, after filtering to main fluid reservoir 14. As such, filling/filtration reservoir 20 has an inlet for the addition of water or another fluid to filling reservoir 20, and an outlet in fluid communication with main reservoir 14. In the depicted embodiment, filling/filtration reservoir 20 may be connected to lid 16 and suspended therefrom, into main fluid reservoir 14. Exemplary filling/filtration reservoir 20 is thus nested within main fluid reservoir 14. In the depicted embodiment, filling/filtration reservoir 20 is generally cylindrical in shape having a bottom thread 22, about its outlet. Of course, a person skilled in the art will readily appreciate that filling reservoir 20 may be formed in numerous other ways. For example, filling reservoir 20 may extend from the interior of a wall defining of container 12, defining main reservoir 14. Filling reservoir 20 may also have any suitable shape, and cross-sectional areas.

Filling reservoir 20 may have a volume equal to between ⅓ and ½ of the volume of main fluid reservoir 14. Of course, other alternative dimensions will be apparent to one skilled in the art.

Figure 11:
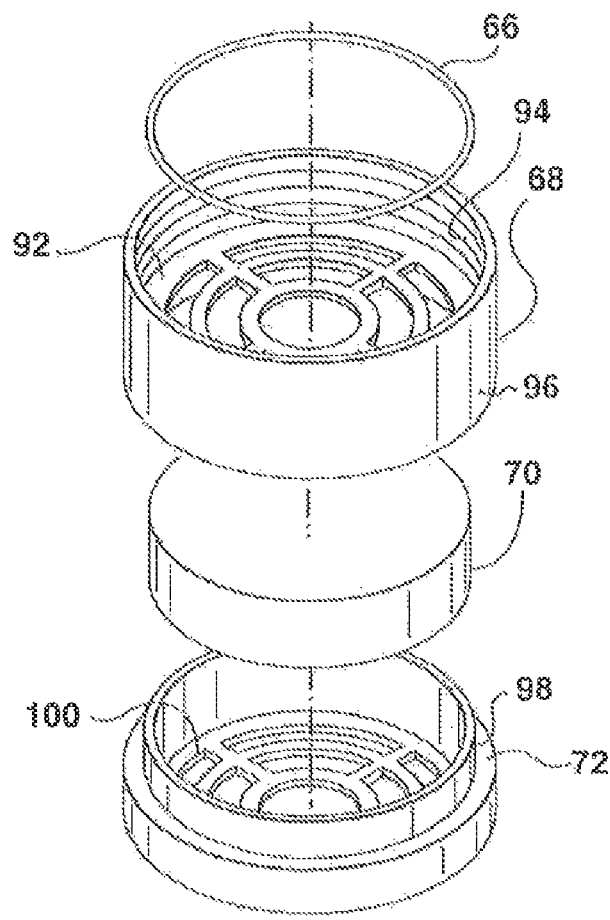
FIG. 11 is an exploded view of a filter assembly of the container of FIG. 1.

As will become apparent, thread 22 is suitable for engaging a generally circular filter assembly 28 having a thread 94 complimentary to thread 22. An example filter assembly 28 is further depicted in FIG. 11. Filter assembly 28 is formed of a top filter housing 68, a filter 70, and a bottom filter housing 72. Top filter housing 68 may be formed as a cylindrical ring having thread 94 about its top to engage thread 22 of filling reservoir 20. A circular web 92 spanning the cross-section of top filter housing 68 is placed proximate the bottom end of top filter housing 68, such that a boss 96 is formed at the bottom end of top filter housing 68. Bottom filter housing 72 is a cylindrical ring having a shape and dimension complementary to that of top filter housing 68, and has a lip 98 formed at its top end to engage boss 96. Bottom filter housing 72 has at its bottom end a circular web 100 spanning its cross section to form a bottom end of bottom filter housing 72. Filter 70 is received in bottom filter housing 72 directly above circular web 100. Bottom filter housing 72 is secured to top filter housing 68 by engaging lip 98 with boss 96. An O-ring 66 is disposed on circular web 92 of top filter housing 68 to seal the threaded connection between filling reservoir 20 and filter assembly 28. It may be appreciated that filling reservoir 20 and filter assembly 28 may be engaged by other suitable connector other than a threaded connection. Similarly, bottom filter housing 72 and top filter housing 68 may be engaged by other suitable connector other than a boss and a lip.

Filter 70 may include any suitable filtration material that absorbs, adsorbs or reacts with contaminants. Filter 70 may for example be a fibreglass, carbon, ceramic, ion exchange resin, or similar microfilter having pores that are in micron or sub-micron size range, mounted in a threaded rim. For example, filter 70 may be formed as a fibreglass filter having pores that are between 0.1 and 1.2 microns. Optionally, filter assembly 28 could be multi-stage filter, with multiple filter elements arranged in flow-series. As will become apparent, thread 22 could be replaced with another connector suitable for mounting filter assembly 28. Filter assembly 28 is thus in series with the outlet of filling reservoir 20 and main reservoir 14. Any liquid passing from filling reservoir 20 to main reservoir 14 passes through filter 70.

Conveniently, filter assembly 28 (and thus filter 70) may be removed and replaced by unscrewing filter assembly 28 from threads 22. As such, filter 70 may be periodically replaced as it captures impurities, debris and the like.

Now, filter 70 is chosen with a pore size requiring liquid to be mechanically urged or forced therethrough. To this end, mounted within filling/filtration reservoir 20 is a plunger assembly 30, more particularly illustrated in FIG. 2. As illustrated, plunger assembly 30 includes a main shaft 32 with a grip 34 mounted on its end.

Figure 2:
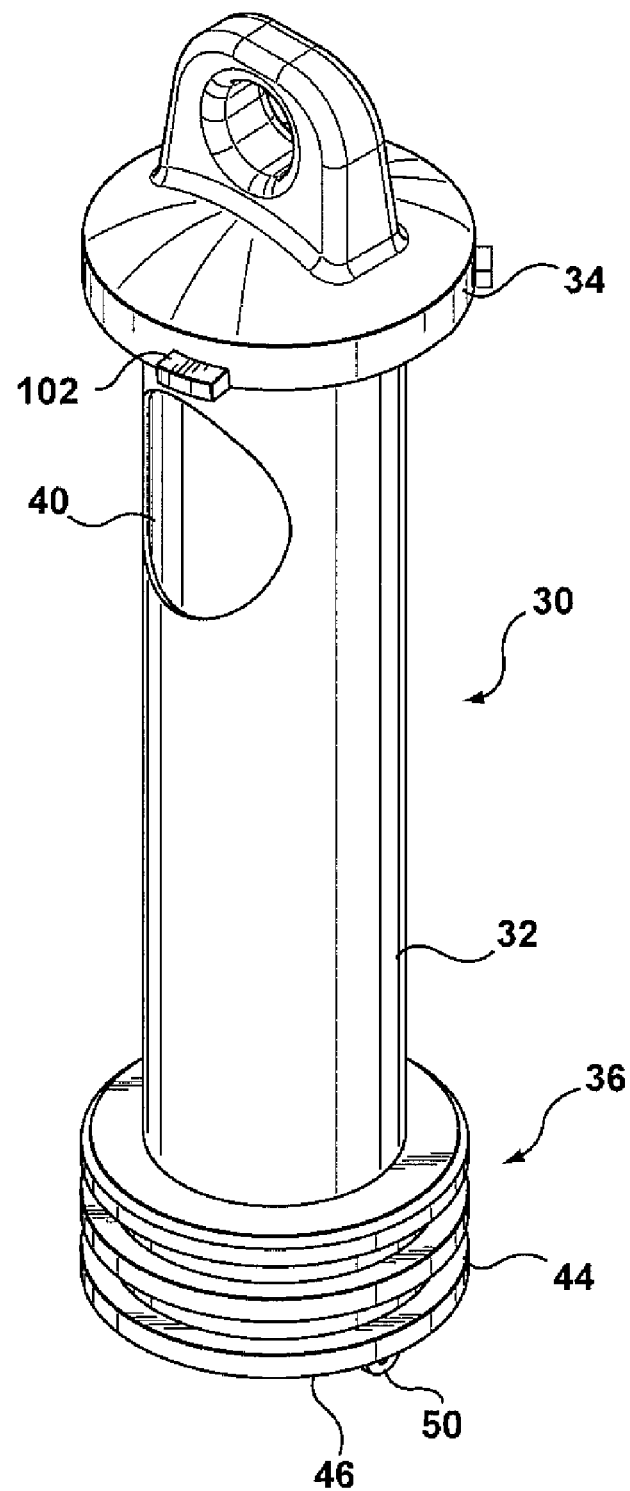
FIG. 2 is a perspective view of a plunger assembly of the container of FIG. 1A

A plunger head 36 is mounted at the opposite end of main shaft 32. Plunger head 36 is attached to main shaft 32 as depicted in FIG. 2. Plunger head 36 is further depicted in FIG. 3. Plunger head 36 rests in the interior of filling reservoir 20, and is sized complementary to the interior walls of filling reservoir 20. Main shaft 32 extends from filling reservoir 20, as depicted in FIG. 1A, and in its extended position has a portion extending exterior to filling reservoir 20.

Shaft 32 allows plunger head 36 to be moved up and down within filling reservoir 20. Grip 34 has a plurality of tabs 102 which engage complementary notches 104 formed on lid 16. Grip 34 allows for the gripping and the exertion of force on shaft 32.

Up and down motion of main shaft 32 thus respectively increases and decreases the volume of the portion of filling reservoir 20 between filter assembly 28, and plunger head 36.

Now, in order to allow filling of filling reservoir 20 from an external source, main shaft 32 includes a lengthwise extending passageway 38, extending from a filling opening 40 extending through a sidewall of shaft 32 to an opening 42 in the bottom of shaft 32. Opening 40 is formed proximate grip 34 on the side of shaft 32.

Figure 3:
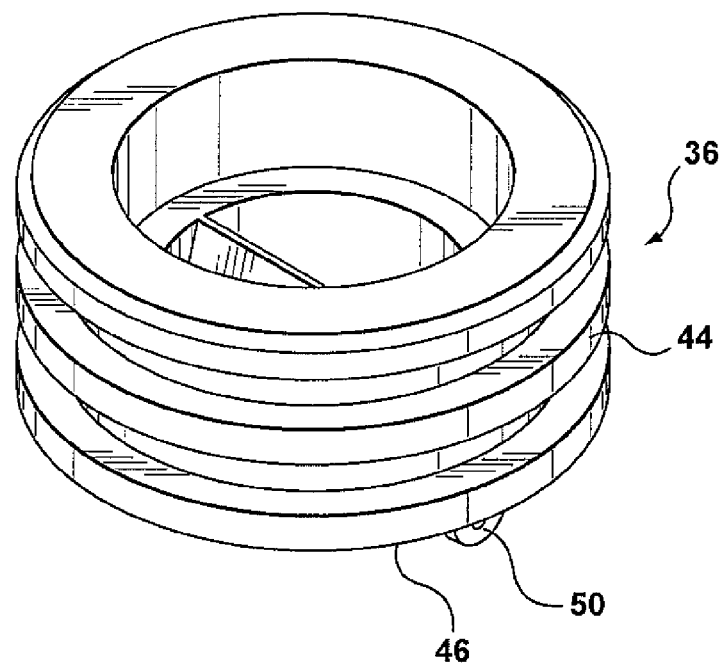
FIG. 3 is a perspective view of a plunger head of the plunger assembly of FIG. 2.
Figure 4:
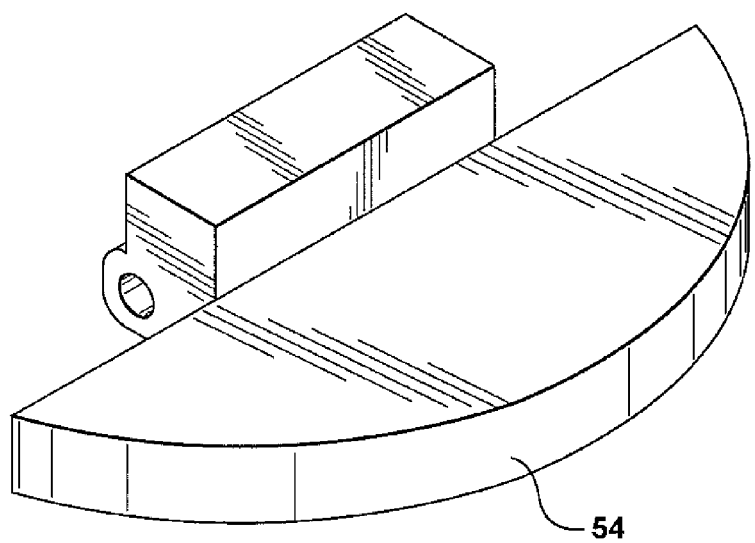
FIGS. 4 and 5 are perspective views of flaps forming a valve of one embodiment of the plunger assembly of FIG. 2.
Figure 5:
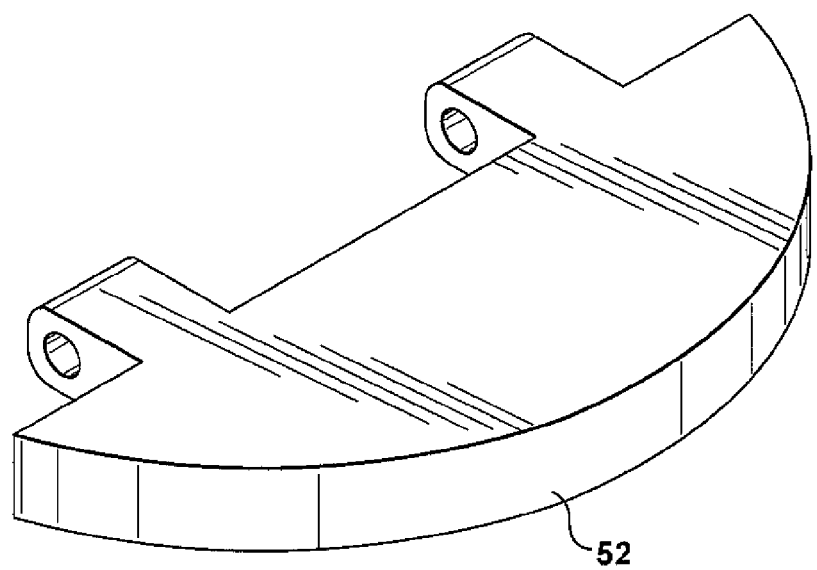

As illustrated in FIG. 3, plunger head 36 includes an annular outer wall 44 made of a resilient material such as rubber, plastic, or a harder material with O-rings or the like, defining an opening 46 in flow communication with passageway 38 defined by shaft 32. Opening 46 has mounted therein a valve, denoted generally by reference numeral 50.

In one embodiment as depicted in FIGS. 3-5, 8A and 8B, valve 50 is formed of two pivoting flaps 52 and 54. As will become apparent, valve 50 act as a one-way valve, allowing opening 46 to be open, and thus allowing liquid to exit from passageway 38 into filling reservoir 20, but not from filling reservoir 20 into passageway 38, as plunger head 36 is urged downward.

Flaps 52, 54 pivot about an axis generally extending through the diameter of annular outer wall 44 and pivot between an open position and a closed position. In the open position of valve 50, flaps 52 and 54 are rotated or pivoted downwardly away from shaft 32 and in the closed position of valve 50, flaps 52, 54 lie in the plane generally perpendicular to the longitudinal extent of shaft 32. A minimal net upward force on flaps 52, 54 move or pivot them into their closed position, while a minimal net downward force causes flaps 52, 54 to rotate into their open position. In their closed position, flaps 52, 54 abut with an interior ridge 56 of annular wall 44, creating a substantially or entirely watertight seal. As such, addition of a liquid through passageway 32 into an empty or partially empty reservoir 20 opens valve 50. Annular ring 44 of plunger head 36 further forms a generally water impermeable seal with the inner wall of housing of filling reservoir 20. As desired, annular wall 44 may include one or more ridges, O-rings, or the like, to assist in sealing wall 44 within filling reservoir 20.

Figure 6:
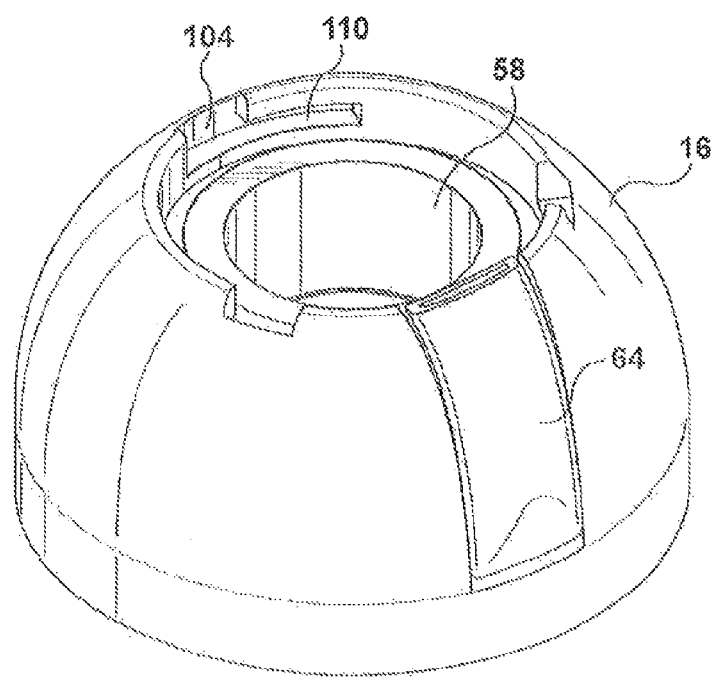
FIG. 6 is a perspective view of a lid of the container of FIG. 1A.

Lid 16 is further depicted in FIG. 6. As illustrated, lid 16 is dome shaped and includes a top opening 58 around which filling reservoir 20 is mounted, suitable for receiving plunger assembly 30 to allow sliding of plunger assembly 30 up and down within the interior of filling reservoir 20. Lid 16 has a plurality of notches 104, each having a sliding annular channel 110 formed thereon extending between about 5° to 15° around the periphery of top opening 58, and grip 34 has a plurality of complementary tabs 102 (as best viewed in FIG. 2) which fit into notches 104 and channels 110. Grip 34 may be securely fastened to lid 16 by aligning tabs 102 to fit into notches 104, and rotating grip 34 to engage tabs 102 into channels 110 to securely lock grip 34 to lid 16, for easy transport, storage and the like. Conveniently, when grip 34 is securely locked, opening 40 is contained within filling reservoir 20, and preventing dirt or other matter from entering opening 40 or water to leave opening 40. An O-ring 90 placed above opening 58 of lid 16 seals the connection between grip 34 and lid 16 to prevent leakage.

Figure 7:
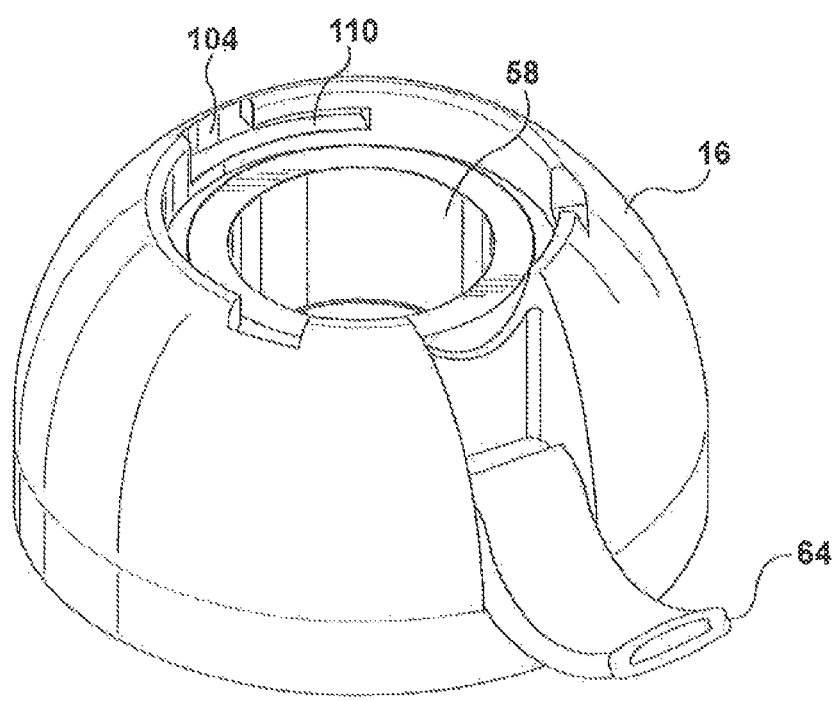
FIG. 7 is a perspective view of drinking spout of the container of FIG. 1A.
Figure 8A:
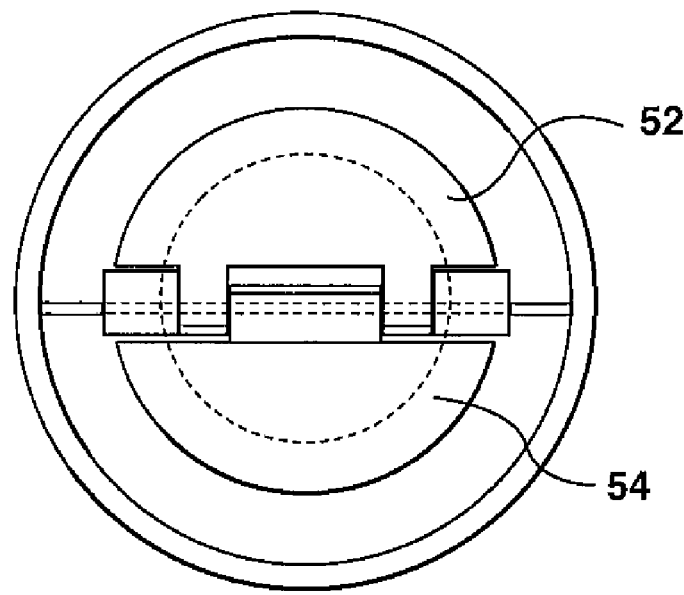
FIG. 8A is the top view of the flaps of FIGS. 4 and 5 forming a valve in a closed position, in one embodiment of the plunger assembly of FIG. 4.
Figure 8B:
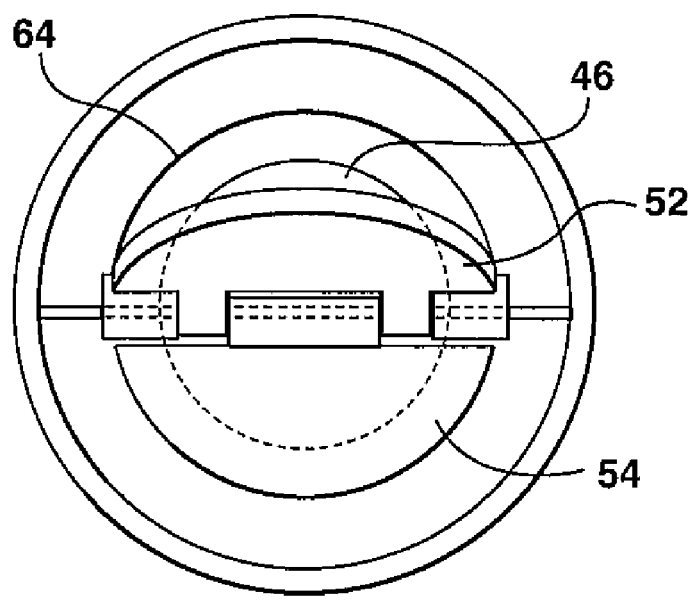
FIG. 8B is the top view of the flaps of the valve in FIG. 8A, with one flap open.
Figure 9A:
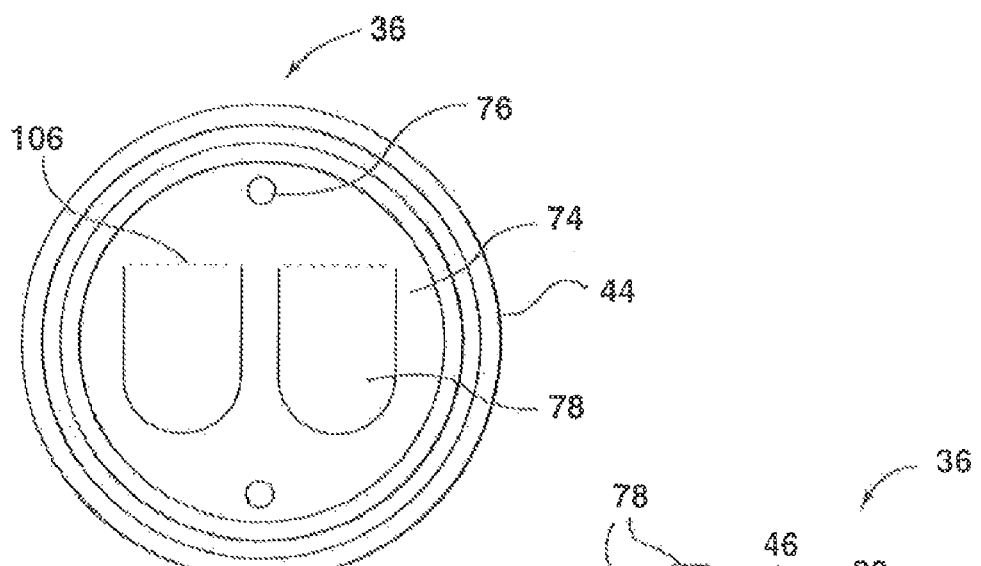
FIG. 9A-9D illustrate an alternate valve.
Figure 9B:
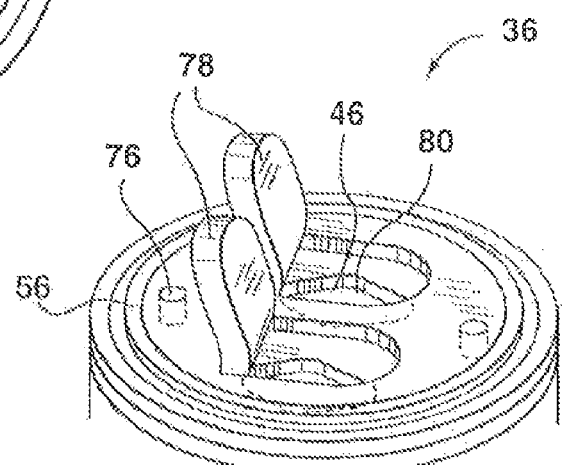
Figure 9C:
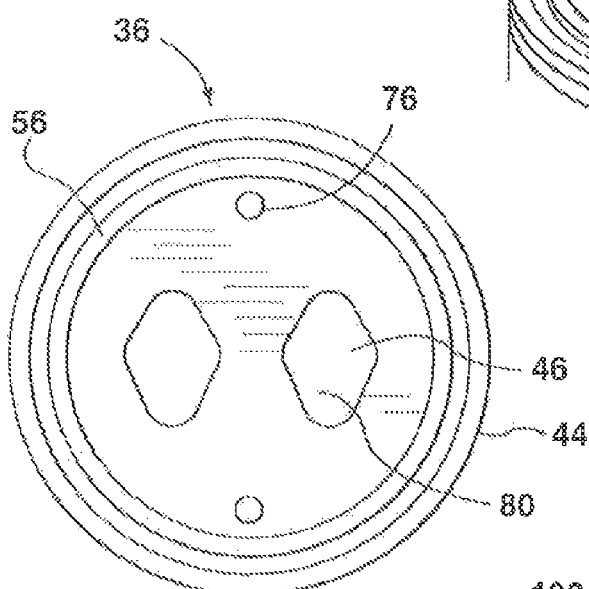
Figure 9D:
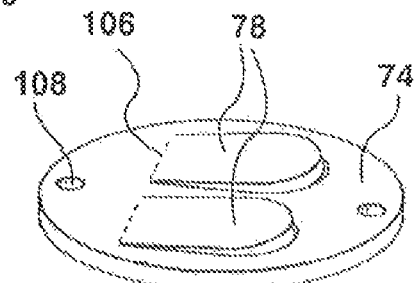

A drinking spout 64 may be mounted on the side of lid 16 and be in flow communication with main reservoir 14 without being in flow communication with filling reservoir 20. Drinking spout 64 may further have mounted thereon a an opening that pivots, to provide a valve and drinking nozzle 62 as depicted in FIG. 7. Pivoting nozzle 64 opens and closes its ball valve thereby opening container 12, allowing unobstructed passage liquid from main reservoir 14, or sealing drinking container 10, for easy transport.

Figure 12:
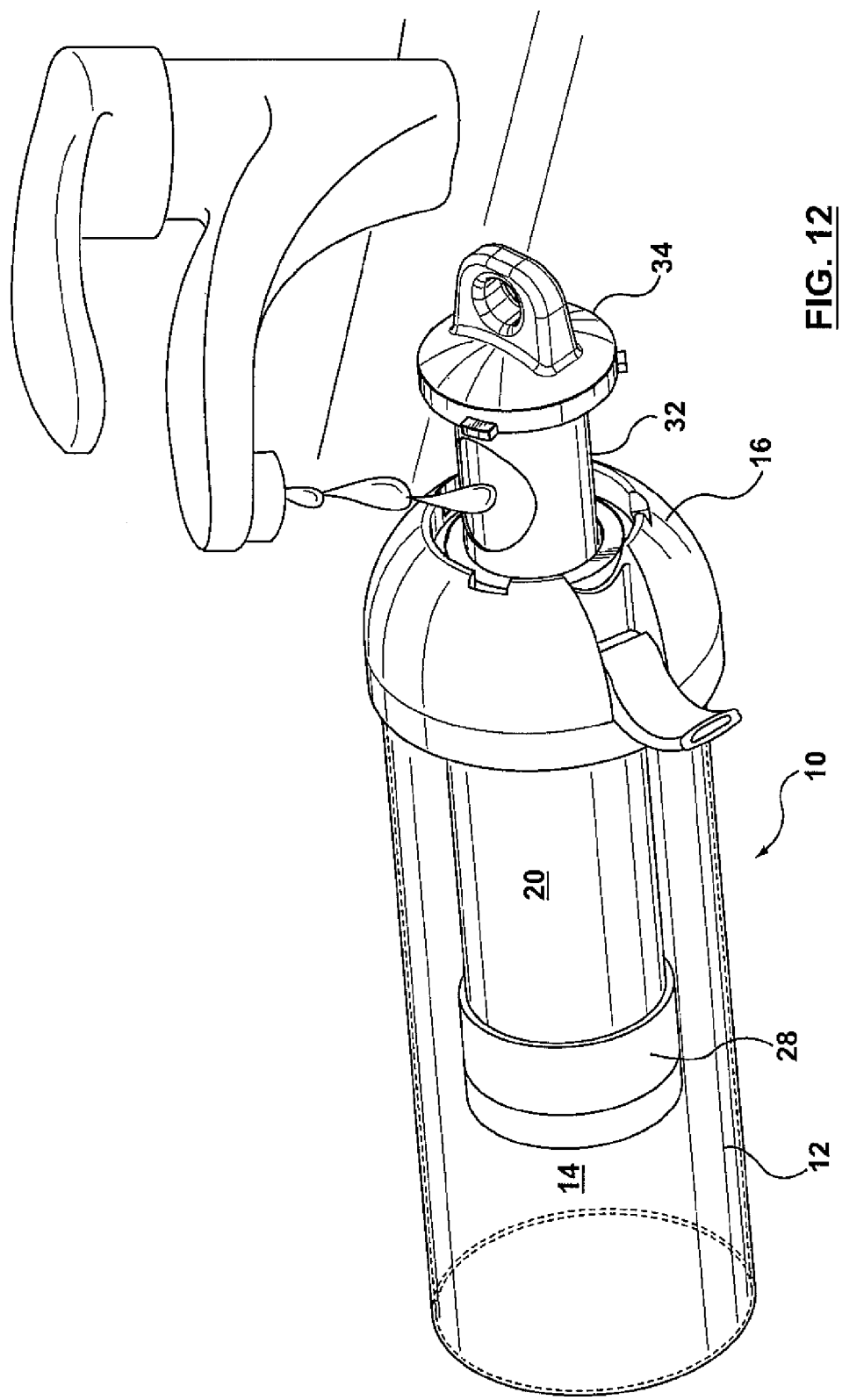
FIG. 12 is a perspective view of the container of FIG. 1, in use.

In operation, drinking container 10 is assembled as illustrated in FIGS. 1A and 1B. Plunger assembly 30 is extended, so that shaft 32 extends from filling reservoir 20 and opening 40 is exterior to the filling reservoir 20. Liquid may now be added through opening 40. Conveniently, as opening 40 is easily accessible when drinking container 10 is in a near horizontal orientation, drinking container 10 may be placed in a substantially horizontal orientation allowing it to be placed under a tap or fountain for easy filling, as depicted in FIG. 12.

Liquid flows from opening 40 through the passageway 38 in shaft 32, into filling reservoir 20. The weight of the liquid urges valve 50 at the bottom plunger assembly 36 to its open position, allowing liquid to flow into filling reservoir 20. To further illustrate the opening of valve 50, FIGS. 4, 5, 8A and 8B illustrate flaps 52 and 54 urged downwardly by the weight of the liquid as it exits passageway 38 into filling reservoir 20 to open valve 50. The amount of liquid allowed into filling reservoir 20 will clearly depend on the extent to which plunger assembly 30 has been retracted from filling reservoir 20. As such, maximal filling will be possible as plunger assembly 30 is extracted to its maximal extent. Filter assembly 28 at the bottom of filling/filtration reservoir 20 prevents the liquid from leaving the filling/filtration reservoir 20 without an additional applied force. Once filling/filtration reservoir 20 is suitably full, plunger assembly 30 may be urged downward using manual force exerted by the hand of the user on grip 34. Manual force downward force exerts a net upward force on valve 50 to close valve 50, thereby preventing liquid from back flowing from filling reservoir 20 into passageway 38 of plunger assembly 30.

As illustrated in FIGS. 4, 5, 8A and 8B, the urging of plunger assembly 30 downwardly causes flaps 52,54 to rotate to the closed position and seal against interior ridge 56. Downward force exerted by plunger head 36 onto the liquid urges or forces liquid through filter assembly 28 into main reservoir 14. Once plunger assembly 30 has been depressed to its maximum extent, it may again be pulled upward and extracted from filling/filtration reservoir 20 and more liquid may be added, and urged into main reservoir 14 as described until main reservoir 14 is suitably full.

Once filled, filtered liquid in main reservoir 14 may be consumed through spout 64. For transport, spout 64 may be sealed by a drinking valve (not shown), and grip 34 may locked to lid 16.

As may be appreciated, many modifications to drinking container 10 are possible. For example, valve 50 may be replaced with one or more other suitable valves allowing inflow of water into filling reservoir 20, without allowing backflow into passageway 38.

For example, valve 50 may be formed as a membrane 74 having formed flaps 78 as illustrated in FIG. 9A-9D. As shown in FIG. 9A-9D, flaps 78 are generally U-shaped and may have a score line 106 to assist in maintaining flaps 78 in an open position. Flaps 78 may be formed by cutting or incising the membrane to form its U-shape. Flaps 78 may, of course, have other configurations: they may be V-shaped, square, oval, round, or the like.

Plunger head 36, in turn, may have a corresponding number of openings 46 with interior ridges 80 that are complementary to, but smaller in size than, flaps 78. Membrane 74 may further include two through holes 108 that fit into two complementary protrusions 76 on the bottom face of plunger head 36 to secure membrane 74 to plunger head 36. Similar to flaps 52, 54 in the first embodiment, flaps 78 act as a one-way valve in allowing water filled through opening 40 on main shaft 32 to exit passageway 38 into filling reservoir 20, but does not allow water to enter passageway 38 from filling reservoir 20. As liquid is filled through opening 40 on main shaft 32, the weight of the liquid causes flaps 78 to open to allow water to exit from passageway 38 to filling reservoir 20. Upon exertion of a downward force on plunger head 36, once membrane 74 encounters the water filled in filling reservoir 20, the water will exert an upward force on flaps 78 and cause flaps 78 to close and seal against interior ridges 80 of openings 46 on plunger head 36. As openings 46 and its interior ridges 80 have a smaller area than flaps 78, a tight seal is formed when flaps 78 are pressed against openings 46 to prevent water from entering passageway 38 from filling reservoir 20.

Membrane 74 may for example be an elastomer, rubber, or other flexible material and the flaps may be formed by die-cutting or other known methods. It should be appreciated that membrane 74 may have more or fewer than two through-holes 108, and plunger head 36 may have more or fewer than two complementary protrusions.

Figure 10:
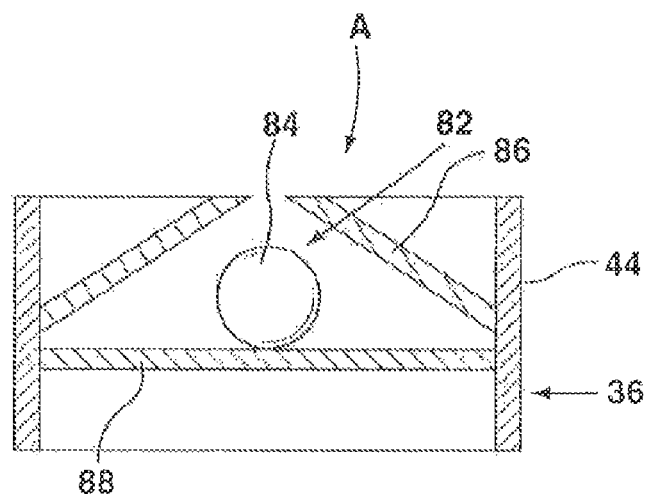
FIG. 10 is a schematic view of yet another alternate valve.

In another embodiment, valve 50 may be formed as a ball check valve 82 without a spring. As illustrated in FIG. 10, ball check valve 82 may be disposed within plunger head 36, and has ball 84 seated in the space between valve seat 86 and cage 88. As liquid is filled into opening 40 of main shaft 32, and exits passageway 38 into filling reservoir 20 in the direction as indicated by arrow A, the weight of the liquid forces ball 84 to be seated against cage 88, and the orifice formed at valve seat 86 allows water to penetrate from passageway 38 into filling reservoir 20. Upon exertion of a downward force on plunger head 36 and upon encountering the water filled in filling reservoir 20, ball 84 will be forced upward against valve seat 86 to seal the orifice and prevent water from entering the passageway 38 from filling reservoir 20. As such, ball check valve 82 acts as a one-way valve to allow water to enter only from passageway 38 to filling reservoir 20.

Other possible embodiments of valve 50 may include a plunger head 36 equipped with a manually actuated valve that may be opened and closed by an operator. A person skilled in the art will readily appreciate that other known one-way valves would be suitable as valve 50.

Conveniently, drinking container 10 is portable and allows for manual filtration of water to be consumed at any desirable location. Simple mechanical force allows the liquid to be filtered through filter 70 without complex levers or chemicals.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:
1. A drinking container comprising:
a main reservoir;
a filling reservoir;
a filter connecting said filling reservoir to said main reservoir; a plunger assembly having a plunger head in said filling reservoir and a shaft extending therefrom, said shaft defining a passageway from an opening in said plunger head, and a filling opening to said passageway, extending through a side wall of said shaft, to allow addition of liquid through said passageway into said filling reservoir;

a valve allowing closing of said opening to allow said plunger head to be urged into said filing reservoir, thereby urging liquid in said filling reservoir through said filter into said drinking reservoir;

wherein said filling opening is received in said filling reservoir, when said plunger head is completely urged into said filling reservoir.

2. The container of claim 1, wherein said valve comprises a flap, moveably mounted on the bottom of said plunger head.

3. The container of claim 1, wherein said valve comprises a ball valve mounted on the bottom of the plunger head.

4. The container of claim 1, further comprising a spout in flow communication with said main drinking reservoir.

5. The container of claim 4, further comprising a drinking valve to close said spout.

6. The container of claim 1, comprising a lid, at least partially closing said main drinking reservoir.

7. The container of claim 6, wherein said filling reservoir extends from said lid into said main reservoir.

8. The container of claim 7, wherein said shaft extends through said lid.

9. The container of claim 8, wherein said filling reservoir is substantially cylindrical.

10. The container of claim 9, wherein said plunger head comprises a generally annular body, nested within said filling reservoir.

11. The container of claim 1, wherein said filter is held in a removable filter assembly.

12. The container of claim 1, wherein said filter comprises at least one of fibreglass, carbon, ceramic, and ion exchange resin.

13. The container of claim 12, wherein said filter has a pore size of between about 1 to 1.2 microns.

14. A method of filtering a liquid for consumption, comprising:

providing a drinking container comprising a main reservoir and a filling reservoir, a porous filter extending between said main reservoir and said filling reservoir, and a plunger assembly extending from said filling reservoir, said plunger assembly comprising a plunger head in said filling reservoir and a shaft extending therefrom, said shaft defining a passageway from an opening in said plunger head and a filling opening to said passageway, extending through a side wall of said shaft, to allow addition of liquid through said passageway into said filling reservoir;

adding a desired amount of liquid to said filling reservoir through the passageway in said plunger assembly;

sealing said passageway to prevent back flow from said filling reservoir into said passageway;

urging said plunger assembly through said filling reservoir to urge said desired amount of liquid from said filling reservoir, through said porous filter and into said main reservoir;

wherein said filling opening is received in said filling reservoir, when said plunger head is completely urged into said filling reservoir.

15. The method of claim 14, further comprising sealing said drinking container for transport.

* * * * *

UNITED STATES PATENT AND TRADEMARK OFFICE
CERTIFICATE OF CORRECTION

| | | |
|---|---|---|
| PATENT NO. | : 8,277,666 B2 | Page 1 of 1 |
| APPLICATION NO. | : 12/621833 | |
| DATED | : October 2, 2012 | |
| INVENTOR(S) | : Patricia Kim Sturgess | |

It is certified that error appears in the above-identified patent and that said Letters Patent is hereby corrected as shown below:

In the Claims

In claim 3, column 7, line 15, "the plunger head" should read --said plunger head--;

In claim 4, column 7, line 17, "main drinking reservoir" should read --main reservoir--;

In claim 6, column 7, line 21, "main drinking reservoir" should read --main reservoir--; and In claim 13, column 8, line 5, "about 1 to 1.2 microns" should read --about 0.1 to 1.2 microns--.

Signed and Sealed this
Eighteenth Day of March, 2014

Michelle K. Lee
*Deputy Director of the United States Patent and Trademark Office*